Figure 2:
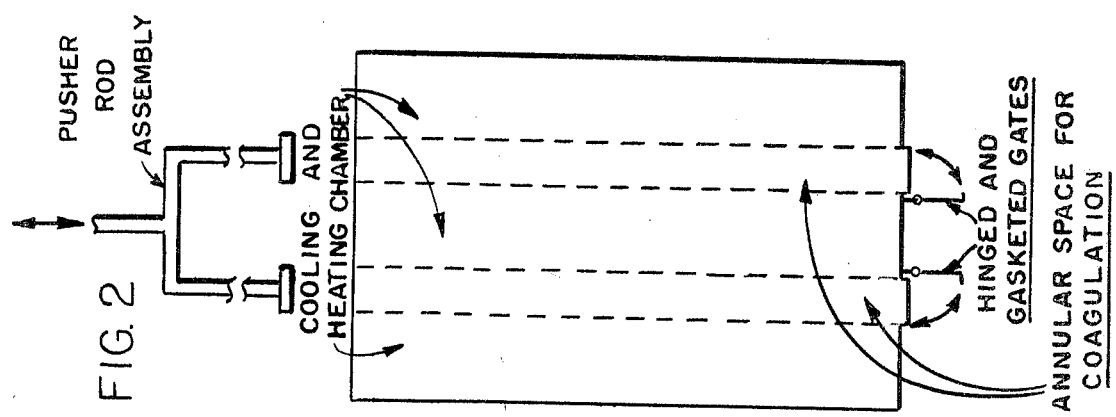

United States Patent [19]

Wiker et al.

[11] 4,421,770

[45] Dec. 20, 1983

[54] METHOD OF PREPARING HIGH PROTEIN SNACK FOOD FROM EGG PROTEIN

[75] Inventors: Jan M. Wiker, Rowland Heights, Calif.; Franklin E. Cunningham, Leonardville, Kans.

[73] Assignee: Kansas State University Research Foundation, Manhattan, Kans.

[21] Appl. No.: 361,411

[22] Filed: Mar. 24, 1982

[51] Int. Cl.³ .......................... A23J 3/00; A23L 1/32
[52] U.S. Cl. ..................... 426/89; 426/103; 426/293; 426/305; 426/614; 426/657; 426/438
[58] Field of Search .............. 426/614, 293, 295, 296, 426/305, 89, 103, 438

[56] References Cited

U.S. PATENT DOCUMENTS

| | | | |
|---|---|---|---|
| 3,208,851 | 9/1965 | Antinori et al. | 426/293 |
| 3,475,180 | 10/1969 | Jones | 426/614 |
| 3,723,137 | 3/1973 | Fischer et al. | 426/293 |
| 3,823,659 | 7/1974 | Hubka et al. | 99/353 |
| 3,980,009 | 9/1976 | Petersen et al. | 99/353 |
| 3,987,212 | 10/1976 | Seeley et al. | 426/614 X |
| 4,138,507 | 2/1979 | Iimura | 426/614 |

FOREIGN PATENT DOCUMENTS

| | | | |
|---|---|---|---|
| 2534426 | 3/1977 | Fed. Rep. of Germany | 426/614 |
| 2651815 | 1/1978 | Fed. Rep. of Germany | 426/614 |
| 1371512 | 10/1974 | United Kingdom | 426/614 |

OTHER PUBLICATIONS

Meyer, A. "Eggs and How to Use Them", published by Author, N.Y., 1898, pp. 82–84.
"The Gourmet Cookbook", Gourmet Distributing Corp., Kingsport Press Inc., Kingsport, Tenn., 1950, pp. 124, 125.
Ernst, "The Natural Long Egg", *Poultry Tribune*, Aug. 1979, pp. 32, 34, and 37.
Nath et al., 1973, *Poultry Sci.*, 52: 1827–1830.
Nath et al., 1972, Agric. Food. Chem., 20: 792–794.
Woodroof, 1946, *Quick Frozen Foods*, 8 (9): 90.

*Primary Examiner*—Robert A. Yoncoskie

[57] ABSTRACT

A high protein snack food is prepared from egg protein, preferably in the form of egg white, by a process involving the heat-coagulation of a molded body of the egg protein composition, cutting the body to form slices, coating the exterior surface of the slices with a liquid batter mix containing starch as a principal ingredient, then breading and deep-fat frying the battered coagulum slices to seal their outer surfaces. By this process, water weeping of the slices during frozen storage, thawing and reheating is substantially prevented.

13 Claims, 2 Drawing Figures

METHOD OF PREPARING HIGH PROTEIN SNACK FOOD FROM EGG PROTEIN

BACKGROUND AND PRIOR ART

Processes and apparatus are known for producing coagulated egg products in the form of elongated shaped bodies. U.S. Pat. No. 3,285,749 describes the preparation of an egg product from egg yolk and egg white by molding cooked egg yolk into the form of an elongated body, and locating this body concentrically within an annular body of raw egg white, and thereafter coagulating the egg white around the egg yolk to produce the composite product.

U.S. Pat. Nos. 3,823,659 and 3,980,009, describe apparatus for producing an egg product in the form of elongated bodies having a central core of congealed egg yolk enclosed within an annulus of coagulated egg white. There is no suggestion that the apparatus is to be used for producing annular bodies from egg white having no egg yolk cores. Similar apparatus is available commercially from Sanovo Food & Engineering, Ltd., Odens, Denmark; and commercial egg products utilizing this type of apparatus for their manufacture have been marketed in the United States and other countries. (See Ernst, "The Natural Long Egg", *Poultry Tribune*, August, 1979, pages 32, 34, and 37.) On the basis of existing knowledge about the processing of egg whites to produce cooked products for commercial distribution, it would be anticipated that an egg white snack food product would have unsatisfactory characteristics. When egg white is cooked, an exudate results which amounts to 2 to 3% of the product weight and is rich in the protein ovomucoid (Nath et al., 1973, *Poultry Sci.*, 52: 1827–1830). When the cooked egg white is stored at refrigerator temperatures, the amount of exudate reaches 2.7% in 7 days. The exudate includes proteins, carbohydrates, and minerals (Nath et al., 1972, *Agric. Food Chem.*, 20: 792–794). Further, it has been known for some time that cooked egg whites could not be used as frozen foods because the whites become rubbery, granular, watery, and tends to separate into small clumps or layers (Woodroof, 1946, *Quick Frozen Foods*, 8 (9): 90).

SUMMARY OF INVENTION

The method of this invention for preparing a high protein snack food product is based in part on the discovery of how to prevent water weeping of deep fat fryed coagulated egg protein slices. In developing the present invention, it was found that the exterior surfaces of egg coagulum slices can be substantially sealed by coating the slices with a liquid batter mix containing a substantial amount of gelatinizable starch. The sealing action occurs when the coated slices are subjected to deep fat frying. It was unexpected that cooked egg white rings prepared by the method of this invention can be held frozen without the quality defects which are known to be associated with cooked egg whites. Coagulated egg white rings, for example, when battered and breaded, then deep fat fried to seal the coating, do not have an appreciable exudate when thawed. Furthermore, the egg white does not become rubbery, granular, or watery, nor does it tend to separate into clumps or layers. These are believed to be new results with respect to prior knowledge that cooked egg white exude a watery liquid. Even after 6-weeks of frozen storage, followed by reheating (either in deep fat or a hot oven), the coated and sealed egg white rings remain dry on their outer surfaces, and retain good texture and flavor.

The process steps and permissible variations thereof by which the foregoing results can be accomplished will be described in detail in the following specification.

THE DRAWINGS

Figure 1:
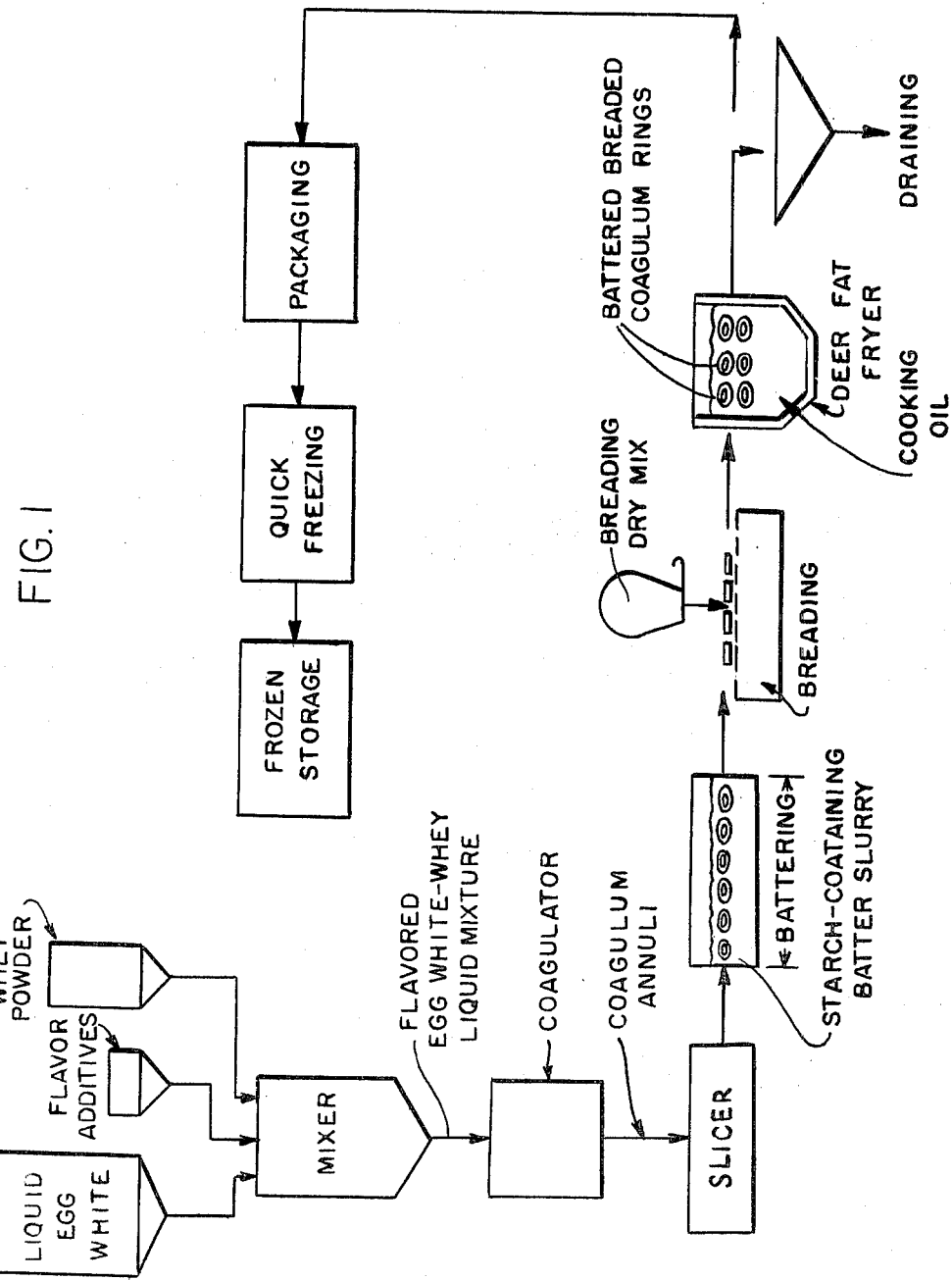

In the attached drawings,

FIG. 1 is a diagramatic flow sheet illustrating an embodiment of the method of this invention for preparing a high protein snack food;

and paragraph FIG. 2 is an enlarged elevational view showing in diagramatic form the kind of coagulator that can be used in one of the steps of the method of this invention.

DETAILED DISCLOSURE

Snack food products utilizing the general method of this invention can be prepared from raw egg white, or a mixture of egg white and egg yolk, such as whole egg. Preferably, however, the egg protein composition contains egg white substantially free of egg yolk. The egg protein composition is in liquid form and is uncooked so that it is in heat-coagulable form. The egg protein composition can contain from 6 to 14% of egg protein solids dispersed in water. Pure egg white contains about 12% solids and 94% of the solids is egg protein. Whole egg contains about 28% solids of which 30% is protein. Therefore, the heat-coagulable egg protein compositions used in the method of the present invention will contain large amounts of water, such as 70% or more of water. The solids present in the egg protein composition will be primarily solids derived from egg white, egg yolk, or mixtures thereof, but may also include other solids such as whey solids. In general, the solids content of the egg protein composition may range from about 12 to 28%, including the egg solids and whey solids, as well as other minor additives. For example, the liquid egg protein composition used as a starting material can contain from 3 to 15% of whey solids, which are preferably spray-dryed sweet whey solids. One preferred formulation comprises 6 to 12% egg white solids (free from egg yolk) together with 3 to 8% whey solids, these percentages being with reference to the whole composition. Alternatively, heat-coagulable egg white solids are used along, except for flavor additives. The composition may therefore comprise from 10 to 14% by weight of heat-coagulable egg white solids disbursed in 70 to 92% of water.

Liquid flavor concentrates (such as bacon or cheese) can be added to the egg protein compositions, such as a liquid blend of egg white and whey, before the cooking operation. Or flavorings can be incorporated into the batter and/or breading to give the finished product a bacon or cheese flavor. The amount of flavorings needed depend upon the strength of the concentrate and the desired flavor potency of the finished product. Sweet products using sugar, fructose, and such flavors as cinnamon and nutmeg could also be made. Such flavor additives are optional and are not essential to the present invention.

After the liquid-heat coagulable egg protein composition has been prepared, the composition is introduced into a mold and coagulated therein to form a shaped body, such as a cylindrical body or a hollow tubular body (viz. an annulus). For producing rings, as in a preferred embodiment of the present invention, the mold is designed to form coagulated annuli. Apparatus for producing coagulated egg bodies either in the form of cylinders or annuli are described in U.S. Pat. Nos. 3,823,659 and 3,980,009, and are available commercially from Sanovo Food & Engineering, Ltd., Odens, Denmark. To produce the coagulation, the molds may be formed of heat-conductive metal, such as stainless steel, and the egg composition subjected to indirect heating such as by contacting low pressure steam or hot water with the mold containing the composition to be coagulated. For example, hot water at a temperature of from about 95° to 100° C. can be used. Prior to removing the coagulated egg bodies from the molds, it is preferable to cool the molds and the bodies therein. For example, this may be done by indirect heat exchange by passing cooling water over the exterior mold surfaces, such as water at a temperature of from about 5° to 20° C. After the molded coagulated bodies have been cooled, they are removed from the molds. The bodies are then cut with a suitable cutting instrument, such as a rotating sharpened blade, to form a plurality of separate coagulum slices. Where the bodies are in the form of cylinders or annuli, transverse slicing is prefered in order to form discs or rings. Other forms of slices can be employed.

In the next step of the method, which is critical for producing the desired results, the coagulum slices are coated with a special batter mix containing a substantial amount of gelatinizable starch. For example, the batter mix which will be in the form of an aqueous slurry, should contain at least 35% up to 80% solids. The starch content should be at least 10% and preferably 20% by weight based on the batter slurry. Starch may be provided by corn starch, or other vegetable starches, and may also be provided by starch-containing ingredients, such as wheat flour, corn flour, cornmeal, etc. These ingredients all contain starch in an uncooked form which will gelatinize on being cooked.

After the exterior surfaces of the coagulum slices have been thoroughly coated with the liquid batter mix, the coated slices may be breaded to improve the appearance, taste and mouth feel (texture) of the slices after deep fat frying. A suitable breading mix can be prepared in dry form, as is well known in the baking art. For example, the breading mix may be formed from a major portion of wheat flour in admixture with small amounts of corn syrup, sugar, vegetable oil, and salt. Other ingredients may be included in minor amounts, such as yeast, or dough conditioners. It should be understood that the "breading step" is itself optional in relation to the broad objects of this invention, and that the particular formulation of the dry breading mix is subject to wide variation, depending on the particular appearance and flavor characteristics it is desired to impart to the deep fried product.

In the next essential step of the method, the battered coagulum slices are subjected to deep fat frying to seal the outer surfaces of the slices. For example, the frying may be carried out in a vegetable oil, such as corn oil or soybean oil, using a frying temperature of from about 160° to about 190° C. The slices are held in the hot vegetable oil until the batter has sealed the surfaces of the slices, and if the slices have been breaded, until the breading has achieved the desired brown color. Usually, such deep fat frying can be completed very quickly, requiring only from about ½ to 2 minutes.

After removal of the slices from the deep fat fryer, they are drained to remove excess cooking oil, and allowed to cool to room temperature before being packaged. The completed high protein snack food product may be packaged in sealed bags, which are then subjected to quick freezing, and thereafter the product is stored in frozen condition. Commercially, it may be distributed as a frozen product, which for use, will be thawed, and reheated. It is therefore important that the snack food products produced in the present invention retain their desirable characteristics during storage, freezing, thawing and reheating and the exterior surfaces of the snack food slices do not become wet with exudate.

The method of this invention and the snack food products which can be produced thereby are further illustrated by the following examples.

EXAMPLES

Suitable liquid heat-coagulable egg protein compositions include the following:

| Composition A | |
|---|---|
| Liquid Egg White (12% solids, 94% protein) | 100% |
| Composition B | |
| Liquid Egg Whites (12% solids) | 85% |
| Whey Solution (50% solids) | 15% |
| Composition C | |
| Egg White (12% Solids) | 75% |
| Whey (50% Solids) | 10% |
| Fructose | 2% |
| Flavors | 1% |

The whey referred to in the above compositions B and C, may be sweet whey, such as spray-dried sweet whey, which will contain milk sugar. If desired, whey protein with the lactose removed (delactosed whey) can be used, or if a low sodium whey is desired, the whey or delactosed whey may be used in a demineralized form.

In addition to the foregoing, liquid egg protein compositions can be prepared from egg white mixed with egg yolk, including whole liquid egg. In general, the yolk component may range from 1 to 30% by weight of the mixture, that is, 1 to 30 parts of yolk will be combined with from 99 to 70 parts of egg white. Egg slices or rings containing egg yolk will have a deeper color, a more egg-like flavor, higher calorie content, and greater energy value per serving. To prepare a low-calorie, no-fat product, however, the yolk is preferably omitted, using only egg white, or a mixture of egg white and whey protein.

BATTER MIX

A suitable batter mix for use in practicing the present invention may be prepared from the following ingredients in the weight proportions indicated:

| Moisture | 5% |
|---|---|
| Wheat Flour | 45% |
| Corn Flour | 35% |
| Salt | 6% |
| Corn meal | 5% |
| Corn Starch | 3% |
| Spices | less than 1% |

The foregoing dry batter mix will contain about 30 to 80% of gelatinizable starch. For use as a battery slurry, it is mixed with water, such as 1 part of water to 1.5 parts of the mix, which will result in a slurry containing about 60% solids.

BREADING MIX

A suitable dry breading mix for use in the method of the present invention can be prepared from the following ingredients in the weight proportions indicated:

| Moisture | 5% |
| --- | --- |
| Wheat Flour | 65% |
| Corn Syrup | 10% |
| Sugar | 5% |
| Vegetable Oil | 5% |
| Salt | 5% |
| Yeast | 1% |
| Sodium stearoyl-2-lactylate | less than 1% |

PROCESSING STEPS

Using a manufacturing procedure as illustrated in FIG. 1 of the drawing, liquid egg white is combined in a mixer with whey powder and flavor additives. These ingredients may be combined in the proportions set out above with respect to Composition C. The prepared egg protein composition is then passed through a suitable coagulator, such as coagulator adapted to form coagulum annuli. For example, a coagulator of the type illustrated in FIG. 2 may be used. In the use of this coagulator, the hinged and gasketed gates are closed, the annular space for coagulation is filled with the egg white composition, and hot water is introduced at a temperature of from 95° to 100° C. into the central and peripheral chambers, comprising the heating chambers. The mix is held until it is firmly coagulated, and then the hot water is removed from the heating chambers, and cooling water is introduced therein, such as water at a temperature of 5 to 20° C. After the exterior surfaces of the coagulated egg white annulus have been additionally firmed by the cooling, the hinged gates are opened so that they hang downwardly in the position illustrated in FIG. 2, and the egg white annulus is pushed out of the bottom of the mold by means of a device, such as the illustrated pusher rod assembly.

The coagulated annuli are then passed through a slicer, as illustrated in FIG. 1, and transversely sliced to produce a series of coagulum rings, which are passed to a battering tank. In this tank, the coagulum rings are immersed in the starch-containing batter slurry, such as the batter slurry prepared as described above. The batter-coated coagulum rings are then passed through a breading station, which in commercial practice may be part of the same apparatus in which the battering operation is carried out. The breading dry mix which is preferably applied to all of the exterior surfaces of the battered rings may be the one described above, and it may be applied from a sifter, being sprinkled onto the rings, which are supported on a sieve table, which permits the excess breading to fall downwardly through the sieve into a collector for reuse, as illustrated in FIG. 1.

The coated, breaded rings are then passed to a deep fat fryer, which contains cooking oil, as illustrated. The cooking oil therein is maintained at a suitable deep fat frying temperature, such as 175° C. After holding the rings in the deep fat fryer for about 1½ minutes, they are removed and placed on a draining table for removal of the excess cooking oil. Thereafter, as illustrated, they may be passed to a packaging station for incorporation in suitable moisture-proof bags, which are then subjected to quick freezing, and stored in frozen condition.

EXPERIMENTAL RESULTS

Egg rings were prepared under laboratory conditions by placing egg whites in a greased 200 ml beaker. A small jar with greased outer surface containing boiling water was placed in the center of the beaker, and both were put in a pan of boiling water. The water was held at boiling until the albumen was fully coagulated. The beaker was then removed and placed in cold water to cool.

When cool, the inner jar was removed and the albumen cylinder removed from the beaker. The cylinder was sliced; the rings were battered and breaded, using materials previously described, and deep-fat fried at 175° C. for 1½ minutes. The rings were then drained, cooled, packaged in polypropylene (Cry-O-Vac) freezer bags, quick frozen at −20° F., and held for six weeks at a temperature of 10° F.

Upon reheating in either deep fat or an oven the rings showed no exudate and had good flavor and texture. Taste panel evaluation indicated the products were exactly comparable to freshly prepared rings.

We claim:

1. The method of preparing a high protein snack food from egg whites for frozen storage, comprising:
    (a) preparing a liquid heat-coagulable egg protein composition from raw egg whites or from a mixture of raw egg whites and raw whole eggs, said composition containing from 6 to 14% of heat-coagulable egg protein solids dispersed in water, said percentages being by weight based on the total composition;
    (b) introducing said composition into a heated mold and coagulating said composition therein to form a shaped body;
    (c) cutting said body after cooling to form a plurality of coagulum pieces;
    (d) coating the exterior surfaces of said pieces with a liquid batter mix containing at least 35% by weight solids in a water suspension, said solids including starch-containing ingredients providing at least 10% by weight of gelatinizable starch based on said batter mix; and
    (e) deep fat frying said battered coagulum pieces to seal the outer surfaces of said coagulum, whereby water weeping of said pieces during frozen storage, thawing, and reheating is substantially prevented.

2. The method of claim 1 in which said egg protein comprises egg white free from egg yolk.

3. The method of claim 1 or claim 2 in which the starch-containing ingredients of said batter mix comprise a mixture of flour and starch.

4. The method of claim 1 or claim 2 in which said coagulum pieces after being coated with said batter mix are covered with particulate breading in adherent relation thereto prior to said deep fat frying.

5. The high protein snack food produced by the method of claim 1 or claim 2.

6. The method of preparing a high protein snack food from egg whites for frozen storage, comprising:
    (a) preparing a liquid heat-coagulable egg protein composition from raw egg whites or from a mixture of raw egg whites and raw whole eggs, said composition containing from 6 to 14% of heat-coagulable egg protein dispersed in water, said percentages being by weight based on the total composition.

(b) introducing said composition into an annular mold and coagulating said composition therein to form a rigid coagulum annulus;

(c) cutting said annular transversely to form a plurality of separate coagulum rings;

(d) coating said coagulum rings with a liquid batter mix containing at least 35% by weight solids in a water suspension, said solids including starch-containing ingredients providing at least 10% by weight of gelatinizable starch based on said batter mix; and (e) deep fat frying said breaded battered coagulum rings to seal the outer surfaces of said coagulum, whereby water weeping of said rings during frozen storage, thawing, and reheating is substantially prevented.

7. The method of claim 6 in which said egg protein comprises egg white free from egg yolk.

8. The method of claim 6 or claim 7 in which the starch-containing ingredients of said batter mix comprise a mixture of flour and starch.

9. The high protein snack food produced by the method of claim 6 or claim 7.

10. The method of claim 6 or claim 7 in which said coagulum rings after being coated with said batter mix are covered with particulate breading in adherent relation thereto prior to said deep fat frying.

11. The method of preparing a high protein snack food from egg white, comprising:

(a) preparing a liquid heat-coagulable egg white composition, said composition containing from 10 to 14% of heat-coagulable egg white solids dispersed in 70 to 92% water, said percentages being by weight based on the total composition;

(b) introducing said composition into an annular mold and coagulating said composition therein to form a rigid coagulum annulus;

(c) cutting said annulus transversely to form a plurality of separate coagulum rings;

(d) coating said coagulum rings with a liquid batter mix containing at least 35% by weight solids in a water suspension, said solids including starch-containing ingredients providing at least 10% by weight of gelatinizable starch based on said batter mix;

(e) covering said battered coagulum rings with particulate breading in adherent relation thereto; and (f) deep fat frying said breaded battered coagulum rings to seal the outer surfaces of said coagulum, whereby water weeping of said rings during storage, freezing, thawing, and reheating is substantially prevented.

12. The method of claim 11 in which the starch-containing ingredients of said batter mix comprise a mixture of flour and starch and provide at least 20% of gelatinizable starch based on the batter mix.

13. The high protein snack food produced by the method of claim 11.

* * * * *